(12) United States Patent
English et al.

(10) Patent No.: US 10,989,692 B2
(45) Date of Patent: Apr. 27, 2021

(54) COMBINED PASSIVE AND ACTIVE METHOD AND SYSTEMS TO DETECT AND MEASURE INTERNAL FLAWS WITHIN METAL RAILS

(71) Applicant: RailPod, Inc., Boston, MA (US)

(72) Inventors: Brendan English, Hull, MA (US); Wesley Kriener, Boxford, MA (US); Sam Dahlberg, Hubbardston, MA (US); Stephen Imsong, Bedford, MA (US)

(73) Assignee: RailPod, Inc., Boston, MA (US)

( * ) Notice: Subject to any disclaimer, the term of this patent is extended or adjusted under 35 U.S.C. 154(b) by 0 days.

(21) Appl. No.: 15/465,524

(22) Filed: Mar. 21, 2017

(65) Prior Publication Data

US 2017/0267264 A1 Sep. 21, 2017

Related U.S. Application Data

(60) Provisional application No. 62/311,061, filed on Mar. 21, 2016.

(51) Int. Cl.
  *G01N 27/82* (2006.01)
  *G01N 23/18* (2018.01)
  (Continued)

(52) U.S. Cl.
  CPC ............ *G01N 27/82* (2013.01); *B61L 23/042* (2013.01); *B61L 23/045* (2013.01); *G01M 5/0025* (2013.01); *G01M 5/0033* (2013.01); *G01M 5/0075* (2013.01); *G01M 5/0083* (2013.01); *G01M 5/0091* (2013.01); *G01N 23/083* (2013.01); *G01N 23/16* (2013.01);
  (Continued)

(58) Field of Classification Search
  CPC ........ G01N 23/18; G01N 27/82; G01N 27/83; G01N 2223/646; B61K 9/10; B61L 23/042; B61L 23/045
  See application file for complete search history.

(56) References Cited

U.S. PATENT DOCUMENTS 1,998,952 A     4/1935  Edgar et al.
2,410,803 A  *  11/1946  Barnes ................... B61K 9/10
                                               324/217

(Continued)

FOREIGN PATENT DOCUMENTS

GB         2490393 B     3/2013
KR     20150065648 A     6/2015
(Continued)

*Primary Examiner* — Aaron L Troost
(74) *Attorney, Agent, or Firm* — Clocktower Law; Erik J. Heels; Michael A. Bartley

(57) ABSTRACT

This invention utilizes two sensing technologies in combination with or in isolation of an automated inspection vehicle to conduct inspections of internal rail flaws in steel railroad track. A vehicle equipped with X-radiation sensing is used as a secondary method to assess the deviations in magnetic fields that are sensed by a primary sensor consisting of a single or multiple magnetometers. The magnetometers sense changes in magnetic field that are correlated to the flaws inside the steel rail. The combination of technologies improves the probability to detect railroad flaws and offers the ability to accurately track and monitor flaws.

17 Claims, 18 Drawing Sheets

(51) Int. Cl.
*B61L 23/04* (2006.01)
*G01N 27/83* (2006.01)
*G01M 5/00* (2006.01)
*G01N 23/083* (2018.01)
*G01N 23/16* (2018.01)

(52) U.S. Cl.
CPC ............ *G01N 23/18* (2013.01); *G01N 27/83* (2013.01); *G01N 2223/646* (2013.01)

(56) References Cited

U.S. PATENT DOCUMENTS

| | | | |
|---|---|---|---|
| 2,622,131 A | 12/1952 | McKee et al. | |
| 3,213,359 A | 10/1965 | Freytag et al. | |
| 3,579,099 A | 5/1971 | Kanbayashi | |
| 3,937,068 A | 2/1976 | Joy | |
| 4,004,455 A | 1/1977 | McKee et al. | |
| 4,143,553 A | 3/1979 | Martens et al. | |
| 4,174,636 A | 11/1979 | Pagano | |
| 4,487,071 A | 12/1984 | Pagano et al. | |
| 4,700,574 A | 10/1987 | Turbe | |
| 4,932,618 A | 6/1990 | Davenport et al. | |
| 5,386,727 A | 2/1995 | Searle | |
| 5,419,196 A | 5/1995 | Havira et al. | |
| 5,522,265 A | 6/1996 | Jaeggi | |
| 5,578,758 A | 11/1996 | Havira et al. | |
| 5,627,508 A | 5/1997 | Cooper et al. | |
| 6,324,912 B1 | 12/2001 | Wooh | |
| 6,549,005 B1 | 4/2003 | Hay et al. | |
| 6,945,114 B2 | 9/2005 | Kenderian et al. | |
| 7,521,917 B2 | 4/2009 | Katragadda et al. | |
| 7,743,660 B2 | 6/2010 | Marsh et al. | |
| 8,150,105 B2 | 4/2012 | Mian et al. | |
| 8,509,969 B2 | 8/2013 | Chen et al. | |
| 8,542,127 B1 | 9/2013 | Goroshevskiy et al. | |
| 8,596,587 B2 | 12/2013 | Hilleary | |
| 8,626,459 B2 | 1/2014 | Di Scalea et al. | |
| 9,031,188 B2 | 5/2015 | Belcher et al. | |
| 2002/0065610 A1* | 5/2002 | Clark | B61D 15/00 702/35 |
| 2003/0128030 A1* | 7/2003 | Hintze | G01N 27/902 324/217 |
| 2005/0285588 A1* | 12/2005 | Katragadda | B61K 9/10 324/126 |
| 2006/0078091 A1 | 4/2006 | Lasiuk et al. | |
| 2009/0132179 A1 | 5/2009 | Fu et al. | |
| 2013/0202090 A1* | 8/2013 | Belcher | B61K 9/10 378/87 |
| 2014/0042331 A1 | 2/2014 | Konkle | |
| 2014/0049251 A1 | 2/2014 | Peyton et al. | |
| 2014/0142868 A1* | 5/2014 | Bidaud | B61D 15/12 702/40 |
| 2014/0145710 A1 | 5/2014 | Noback | |
| 2014/0311377 A1 | 10/2014 | English | |
| 2015/0239480 A1 | 8/2015 | De La Riva | |
| 2016/0002865 A1 | 1/2016 | English et al. | |
| 2017/0038316 A1* | 2/2017 | Belcher | B61K 9/10 |
| 2017/0176389 A1* | 6/2017 | Paulson | B61K 9/10 |
| 2019/0086364 A1* | 3/2019 | Hay | B61L 23/044 |

FOREIGN PATENT DOCUMENTS

| | | | |
|---|---|---|---|
| WO | 2015120550 A1 | 8/2015 | |
| WO | WO-2017088007 A1 * | 6/2017 | ............ G08B 21/22 |

\* cited by examiner

COMBINED PASSIVE AND ACTIVE METHOD AND SYSTEMS TO DETECT AND MEASURE INTERNAL FLAWS WITHIN METAL RAILS

CROSS-REFERENCE TO RELATED APPLICATIONS

This utility patent application claims priority from U.S. provisional patent application Ser. No. 62/311,061, filed Mar. 21, 2016, titled "Combined Passive and Active Method to Detect and Measure Internal Flaws within Metal Rails" naming inventors Brendan English, Paul Sandin, Wesley Kriener, Sam Dahlberg, and Stephen Imsong.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 RailPod, Inc.

BACKGROUND

Field of Technology

This disclosure relates rail inspection, and more specifically to non-destructively detecting internal or other flaws, such as cracks or breaks, in metal rails where the flaws may not be visibly detectable or easily visible by a human.

Background

The railroad industry demands a frequent, accurate, and affordable method to detect internal rail flaws to prevent rails from cracking and to prevent a train from derailing. Internal rail flaw inspections are often conducted once a year or in some cases as many as eight times per year. If schedule, cost, and environment were not barriers, internal rail flaw inspections would be conducted on a weekly if not daily basis. Traditional, contact based, methods of internal rail flaw inspections are restricted by (1) speed and (2) freezing temperatures ultimately leading to limited inspection frequency. Additionally much of today's inspection technology is only able to detect less than 35% of all defects in the rail across all categories/types of defects (as explained in U.S. Patent Application No. 2002/0065610, "Hi-Rail Vehicle-Based Rail Inspection System", Clark et al., May 30, 2002). Operationally, contact based ultrasound systems are limited to top end speeds of approximately 20 MPH in order to provide accurate and repeatable measurements. Additionally, most contact based ultrasound requires a couplant (i.e. water) between the transducer and the rail to minimize signal loss and erroneous readings. In conditions at or approaching the freezing point, the couplant freezes and introduces air gaps impacting the performance of the signal.

The railroad track inspection market as it relates to detecting internal rail flaws that are not easily visible or are not visible consists of two primary inspection methods and related technologies that include (1) ultrasonic and (2) induction inspections. The rail inspection market utilizes a diverse set of automated and manual methods to deploy the ultrasonic and induction technologies along a railroad track which include vehicle tow behind units, vehicle under mount units, and hand held units. In some cases, both of these technologies are used in order to increase the probability of detecting internal rail flaws and minimizing false detections. These technologies provide an input signal to a user interface that is typically a graph (e.g. B-scan) depicting the strength of the signal in relationship to a signal that is known to not have internal flaws. Due to the variation in rails from wear and tear (internal as well as external) on a railroad track, the strength and quality of the internal rail flaw signal varies widely. The variation in signal typically results in poor detection of internal rail flaws upon first pass depending on size and severity of the flaw. A second pass that usually involves a manual inspection method helps to better define and detect the flaw. The industry attempts to minimize the impacts of the varying signals through extensive training, best practices, and combining both automated and manual detection technologies. Due to the need to leverage both automated and manual inspection technologies, the time required to inspect internal rail flaws in railroad track is directly related to the quality of the signal and the number of times required to stop and manually verify an internal flaw exists. Existing track inspection technologies utilize an active emitter and receiver in order to "excite" the rail and observe/capture the resulting energy/signal after the rail has been excited. One such system uses ultrasound. Another system uses eddy current and also is referred to as magnetic induction. Yet another utilizes a high-energy laser to excite the rail. Typically, the receivers complement the emitters. In other words, the ultrasound emitter utilizes an ultrasound receiver to determine the size or location of the flaw. The eddy current (i.e. voltage/current induction) emitter utilizes a voltage/current receiver to determine location or size of the flaw. In the case of the high-energy laser, the laser produces enough energy to excite the rail, propagating an ultrasound wave where the receiver is an ultrasound device used to detect the internal flaw. Ultrasonic transducers are typically encapsulated in a flexible wheel that remains in contact with the rail. In most cases, a couplant is used to ensure that no air gap between the transducer and the rail exist because ultrasonic signals can be inhibited severely by air gaps. The use of water as the couplant in ultrasonic systems imposes additional restrictions during freezing conditions where the water freezes upon contact with the cold rail creating air gaps and resulting false calls in the ability to detect a flaw. Industry typically attempts to utilize an anti-freeze solution similar or the same as the windshield washer fluid found in an automobile. This anti-freeze fluid is toxic and harmful to the environment. All of these technologies may use an array of emitters and/or receivers in an attempt to increase the probability of flaw detection and in some cases utilize tomography to visually depict the size and shape of the flaw. In cases where the signal is of question (i.e. the operator is unsure if a flaw exists or to validate a false call) a human must manually verify that the flaw exists using an ultrasonic hand probe manually positioning the ultrasonic transducer at various angles and positions to target the area of interest. This manual process imposes time restrictions on the inspection process and severely limits the number of inspection miles that can be completed in one time period. This manual process of exiting a rail inspection vehicle and manually inspecting the flaw can introduce a time penalty as large as ten minutes or more reducing the overall efficiency of the inspection process. Regardless of technology used to inspect for and detect internal flaws, from an application or operational perspective, a maintainer of railroad track must be able to prioritize the significance of a detected flaw to make an informed decision as to (1) immediately repairing the flaw, (2) reducing train operating speeds over the flaw until it can be repaired, or (3) continuing operations and tracking/monitoring the flaw from one inspection to the next. Due to cost and operational logistics, technology used in today's inspection processes is used infrequently enough where it is difficult to determine the growth of the flaw from one inspection to the next and little to no tracking of growth of flaws is conducted as tracking of flaws would require very frequent inspection. Typically, the flaws, once detected and after the flaws signal exceeds a threshold qualitatively determined by the inspector (which may vary from inspector to inspector based on training and sensing technology) the flaw is marked and scheduled for repair. While waiting for the repair, the train is required to operate slowly through the flaw area until a repair is made.

These existing solutions have multiple shortcomings. Existing internal rail flaw inspections may be required by law as much as twice per year or on an as needed basis. Some of the safety conscious railroads attempt to inspect more frequently (e.g. 4-6 times per year) than twice per year. However, weather plays a significant role in the expansion and general movement of the rail. Significant weather changes over periods less than 24 hours (e.g. extreme temperature transitions) may have a significant impact on growth and impact of an internal flaw. Thus, there is a need for more frequent rail inspections than currently applied.

Existing solutions do not track growth of internal rail flaws. Because existing inspection processes occur infrequently, the ability to track or monitor the progressive growth of internal rail flaws is limited or simply not addressed. The industry typically looks for pass/fail criteria based on the size of the flaw but the inspector has no information as to how quickly a flaw has grown. As a rapidly growing flaw may be of concern even if the size is still below a threshold criteria, there is a need for monitoring growth of internal rail flaws to allow for identification and applicable maintenance actions before the flaw perpetuates to a state that requires either a slow order or replacement of rail that would impact scheduled revenue operations.

Existing solutions use environmentally harmful couplants. Ultrasonic inspection is the leading form of internal rail flaw detection. It requires the use of a couplant to ensure that no air gap exists between the ultrasonic transducer and the rail surface. Typically this couplant consists of water but in freezing or near freezing conditions water could create air gaps and therefore during freezing conditions water is replaced with an anti-freeze couplant. Typically the anti-freeze couplants are harmful to the environment and restricted to use during freezing conditions. In extreme cold conditions, often anti-freeze couplant does not meet the lower temperature requirements and internal rail flaw inspections cease. Thus, there is a need for a method of internal rail flaw inspection which eliminates the use of environmentally hazardous fluids and also allow for inspection operations in extremely cold conditions.

Existing solutions require on-track manual inspections. Internal rail flaw inspection processes are dominated by a human in a rail bound vehicle whereby the human or humans physically drive the vehicle along the rails, monitor the rail flaw inspection technology to qualitatively assess flaw condition, and manually inspect for flaws using a hand operated ultrasonic probe. This increases the costs and time required for inspection. Thus, a need exists for inspection while in motion without a human operator physically present.

Existing solutions are time-intensive, and require a human inspector to accompany the inspection process. This requires the human to physically occupy the railroad track where the inspector competes for track time against other maintenance personnel as well as scheduled revenue service. This competition for track time also imposes safety concerns for the inspector. Thus, a need exists for real-time inspection without requiring the local presence of an inspector.

Existing solutions do not inspect the entire rail. Ultrasonic and other internal rail flaw technologies currently do not conduct inspections of the base of the rail outside of the lateral dimensions of the web of the rail. This is primarily due to the fact that ultrasonic technology is not transmitted to the extents of the base of the rail and therefore cannot sense those areas. Internal flaws at the base of the rail may occur due to manufacturing impurities or surface flaws that grow on the underside of the base due to extended cyclic periods of submersion in water followed by dry conditions, such occurring in tunnels or areas where flooding occurs. Thus, there exists a need to inspect the entire rail including the base.

Existing X-ray imaging of rail flaws in today's industry is typically restricted to very specific tests such as new welds or specific track work due to the fact that x-ray technology requires large amounts of energy to radiate the steel rail and requires a detector that can sense the transmitted energy in a timely manner. This process involves significant preparatory time and many minutes to acquire an image that can depict a flaw.

DESCRIPTION OF PRIOR ART

U.S. Patent Application Pub. No. 2002/006,5610 (Clark et al., "Hi-rail vehicle-based rail inspection system", May 30, 2002) discloses a non-railbound vehicle having an equipment bay and related inspection system consisting of magnetic induction sensor system combined with an ultrasonic system providing sensor output to a data acquisition system. Both the induction and ultrasonic systems are "active" systems meaning that they transmit energy into the rail. In the case of the induction system, a large direct current is injected into the rail using two sets of contacts or brushes. In the case of the ultrasonic system, a series of ultrasonic emitters are embedded in a fluid filled wheel that makes contact with the rail sending an ultrasonic signal into the rail at various angles. Both of the technologies require some form of an emitter in order to generate a signal that is interpreted and depicted on a user interface. Although two systems are used to minimize "false calls" (i.e. indications of a defect where such an indication is actually unwarranted), they both require an active signal to penetrate the rail and monitor the response of the reflected signal. Both systems require a user to interpret the signal and the severity of the signal as it relates to the type of rail flaw. Additionally, the use of "couplant" to ensure no air gap between the rail and the ultrasound transducer limits use of the ultrasound system in freezing temperatures where the couplant would freeze, creating air gaps, and introducing "false calls". In many cases, the user will physically dismount from the non-railbound vehicle and use a hand probe/sensor to manually verify the signal at various aspect angles imposing time restrictions on the inspection process. Additionally a human is required to operate the truck which increases the overall cost of the inspection process reducing the likelihood of frequent inspections that would allow for the system to track and monitor the progression of the flaw itself.

U.S. Pat. No. 7,521,917 (Katragadda et al., Apr. 21, 2009, "Method and apparatus for testing material integrity") discloses a testing apparatus with an electrical conductor that routes current in a direction generally transverse to a longitudinal axis of the object being detected where the electrical current produces an eddy current effect that is sensed by a magnetic field detector. This is focused around a single system, and requires large rectifier packs to supply high current levels into the rail. The system requires a user to interpret the signal and the severity of the signal as it relates to the type of rail flaw. The combination of large rectifier packs, requiring a large rail bound vehicle, and only one method to inspect, restricts the ability to minimize false calls and may require a secondary inspection method to confirm the signal received by the magnetic field detector imposing time restrictions on the inspection process.

U.S. Pat. No. 1,998,952 (R. F. Edgar et al., Apr. 23, 1935, "Rail Inspection Apparatus") discloses a hall effect sensor that requires a current that is caused to flow through an object to be tested or inspected thereby setting up a magnetic field that can be measured/sensed. Similar to above patents, this is an "active" system requiring an emitter to excite the rail in order to sense internal flaws (e.g. cracks, fissures, etc.).

U.S. Pat. No. 3,213,359 (R. W. Freytag et al., Oct. 19, 1965, "Non-Inductive hall-cell magnetometer") discloses a technology that allows the measurement of unknown minute magnetic fields. This focuses on the structural components (e.g. semiconductor wafers) used to build the hall-cell. Many applications similar to this patent place focus on the development and improvements of hall-cell magnetometers.

U.S. Pat. No. 3,579,099 (Kanbayashi, May 18, 1971, "Improved flaw detection apparatus using specially located hall detector elements") discloses a method using a hall generator and electromagnets to magnetize the test material. Similar to other "active" emitter systems, this system requires an electromagnet to excite the rail in order for a sensor (hall cell) to measure internal flaws. This depends on the test material to have a generally circular cross-section and the test material generally be consistent in dimension, something not found in railroad tracks after use or generally as the rail wears down.

U.S. Pat. No. 6,549,005 (Hay et al., Apr. 15, 2003, "Magnetic detection of discontinuities in railway rails using hall effect sensors") discloses a method using a magnetic field generator to leave a remnant magnetized field within the test material. Similar to other "active" emitter systems, this system requires an electromagnet to excite the rail in order for a sensor (e.g. hall cell) to measure magnetic flux leakage related to internal flaws.

U.S. Pat. No. 6,324,912 (Wooh, Dec. 4, 2001, "Flaw detection system using acoustic Doppler effect") discloses a transducer that may transmit an acoustic signal from propagation in the medium or the transducer may transmit optical energy for inducing the acoustic signal in the medium. The transducer may be a laser to generate the acoustic signal as well as a vibrometer interferometer for sensing the acoustic signal. Although this system specifically avoids the need for physical contact with the rail, it depends on an active emitter and the Doppler effect and/or motion of the transducer in order to identify a potential flaw.

U.S. Pat. No. 6,945,114 (Kenderian et al., Sep. 20, 2005, "Laser-air, hybrid, ultrasonic testing of railroad tracks") discloses the use of an emitter in the form of a pulsed laser that propagates waves that can be detected by an ultrasonic receiver. Although this technology avoids the need for physical contact with the rail, it requires a very high-powered laser in order to excite the rail to propagate sound waves. The alignment and power of the laser as well as the alignment of the ultrasonic transducer determine the types of flaws that can be detected. This system does not inspect the base of the rail and requires a human to accompany the system to verify false positives. Additionally, this technology ablates the running surface of the rail and physically changes the rail structure near the surface of the rail. This change in mechanical structure may have short or long term impact resulting in the rail being more sensitive to rolling contact fatigue, engine burn, and other related surface flaws potentially reducing the life cycle of the rail.

None of the above provides a solution for frequent internal rail flaw inspection which (1) tracks the progression of internal rail flaws, (2) minimizes or eliminates the need for environmentally harmful couplant fluid in freezing conditions, (3) eliminates the need for a human to manually conduct an ultrasonic inspection to confirm if a flaw exists, (4) provides near real time transmission of internal rail flaw measurements to inspectors in a remote location, and (5) includes the ability to inspect at the base of the rail. What is needed, therefore, is a solution that overcomes the above-mentioned limitations and that includes the features enumerated above.

BRIEF SUMMARY

A non-contact based internal rail flaw inspection method, such as that as passive magnetometry combined with x-radiation (i.e. x-ray) provides a method to increase the speed of rail inspection and offer an opportunity to inspect in freezing conditions allowing internal rail flaw inspections to be conducted on a more frequent basis, from a remote location, and at higher frequencies.

Passive magnetometer sensing technology combined with frequent (e.g. daily or weekly) use is used to measure a magnetic field, a change in magnetic field, or a rate of change in magnetic field within the rail. The magnetic field changes could be a change in growth of a hairline crack or an internal flaw, such as a transverse fissure. These changes in magnetic field also identify variations in gaps between joints. A database of magnetic signatures as detected by the magnetometer is created to determine the type of defect found in the rail (e.g. defective weld, bolt hole defect, transverse defect, vertical split head, head and web separation, detail fractures, engine burn fractures, rolling contact fatigue). When a flaw is detected using magnetometer technology, a secondary sensor, such as x-ray, is used to image the flaw.

An automated inspection vehicle, while moving at speed, monitors magnetic field, change in magnetic field, or rate of change of the magnetic field with the magnetometer readings from previous inspection events. If the magnetic field exceeds a configurable threshold or if there is history indicating that a flaw exists during a previous inspection, the automated inspection vehicle stops at the location of interest (i.e. the flaw or change in magnetic field) and utilizes an x-ray system to image the rail. Using image processing techniques or by human observation, the x-ray images are analyzed to determine if (1) a flaw exists or (2) if the flaw has changed and by how much.

In some cases magnetic field changes could occur due to variations in the magnetic field surrounding the rail caused by environmental changes or even direct changes to the rail itself from applications such as welding. In cases where the field change is substantially different or the field signature has been altered when compared to previous measurements, a secondary sensor, such as x-ray, is utilized to validate if a flaw exists. Additionally, the x-ray system is used to provide detailed imagery of the flaw itself where the imagery can be used to track growth of the flaw between inspection periods. The combination of a passive magnetometer and x-ray system provides for a frequent, accurate, and affordable method to inspect for internal rail flaws.

Features and Advantages

A passive magnetometer sensor eliminates the problems associated with the air gap in an ultrasonic system. Most ultrasonic systems require a constant contact with a couplant (i.e. water) in order to receive reliable and consistent ultrasonic signals that detect internal flaws. In freezing temperatures or in climates where water might freeze or cause air gaps, a magnetometer system could be utilized regardless of temperatures. Because there is no couplant, there is no environmental impact due to the use of anti-freeze in the couplant. Additionally, there is no need to carry couplant in the vehicle or a need to re-fill the couplant storage tank. Eliminating the need for a couplant storage tank allows for more time inspecting rather than servicing the inspection vehicle, reducing the overall size of the inspection equipment as well as reducing consumable costs. Passive magnetometers require minimal energy, on the order of miliwatts, and can be operated continuously in a variety of environmental conditions.

Use of passive magnetometer sensors allows for faster inspection speeds. Speed of internal rail flaw inspection is limited by ultrasonic inspection technologies due to a variety of reasons including requiring proper contact with the rail and the couplant, and the ability to process and validate the signal either electronically or by a human. Average ultrasonic inspection speeds approach 15-20 MPH. Through the use of passive magnetometers, proper contact with the rail/couplant is not required. This allows for magnetometers to be installed on inspection equipment that can travel at higher speeds, in the range of 40-100 MPH, than are typically found in today's inspection systems. The speed of magnetometers is now limited by processor speed rather than the physical rail/couplant/sensor interaction found in ultrasonic systems. Additionally, the existing human involvement may require the vehicle to stop while the inspector is assessing the quality of the signal. Passive magnetometers and the related software are able to conduct real time comparisons of magnetic field to determine if a flaw has exceeded a critical threshold, minimizing the need for a human to conduct such an assessment. In cases where additional inspection detail is required, the automated x-ray system is able to quickly image the flaw eliminating the need for a human to exit the vehicle, identify the flaw area, conduct a manual hand operated inspection, and then return to the vehicle. Something that takes a human many minutes can be conducted in as little as 10 seconds using an automated x-ray system whereby the vehicle slows to a stop, images the rail in less than 10 seconds, and then continues forward. Through image processing techniques, it is also possible for the x-ray system to image the rail while the vehicle is moving at slow speeds (e.g., 1 MPH). This automated method significantly reduces the inspection time process allowing for more track miles to be inspected more frequently. The x-ray images and magnetometer readings can be transmitted via wireless communications such as cellular or wifi networks so that any human assessment can be conducted in parallel while the automated vehicle continues to inspect.

Passive magnetometer sensors are relatively small, inexpensive to manufacture, and can be placed in an array, offset, or placed in series to accurately identify the location of a flaw in the rail. Additional arrays of sensors can be used to provide secondary back up in case of primary sensor failure during an inspection process and operate as a comparator to ensure all sensors are operating. In addition to inspection at the top of the railhead, magnetometer sensors, in conjunction with an articulating sensor placement, can inspect the entire rail profile including the base of the rail. Existing ultrasonic inspection technology requires a human to physically manipulate an ultrasonic probe to analyze the base of the rail beyond the extents of the width of the web. Leveraging an automated vehicle with an articulating sensor head that can avoid physical obstructions at the base of the rail allows for inspection of the base.

Passive magnetometer sensors have the ability to identify both cracks in rail as well as changes in gaps between two rail joints. The magnetometer sensors are able to resolve centimeter and in some cases millimeter changes, allowing determination of changes in the size of the gap in a joint where one can actually measure the changes due to thermal expansion. Jointed rail (as well as continuously welded rail) will expand and contract with changes in temperature. The ability to measure the changes in gaps allows measurement of longitudinal movement of the rail. Having the ability to measure the longitudinal movement of rail allows predicting and identifying locations where the rail could buckle or break due to longitudinal stress. Combining the passive sensor with frequently collected data, one can determine if the change in gap is a result of sheared or missing joint bolts or some other phenomenon. Utilizing an x-ray device, or a camera, a human or computer vision system can validate a missing or sheared bolt.

Passive non-contact magnetometer sensors provide readings in three axes. For rail flaw detection, a coordinate system typically refers to the X-axis as along the length of the rail, the Y-axis as along the vertical plane perpendicular to the x-axis, and the Z-axis as along the width of the rail. Depending on the type of flaw (e.g. transverse fissure, defective welds, vertical split heads) and generally which plane/axis it resides, a corresponding change in the magnetic field correlates to a specific type of flaw in the rail. In many cases multiple magnetic axes' will be triggered depending on size and shape of flaw. In cases where there are large magnetic field changes on the order of 0.5 to 1.0 or greater gauss from just prior to the flaw to the location of the flaw (i.e. high Gaussian readings), it may be apparent that no further validation, such as the use of x-ray or ultrasonic, is needed to verify that a flaw exists or specific actions need to take place. In other cases, the rate of change from one inspection event to the next inspection event can be used to trigger further examination using technologies such as x-ray or ultrasound.

In addition to detecting magnetic field changes internal to the rail, passive magnetometer sensors are able to detect surface or near surface flaws in the category of rolling contact fatigue which includes flaws such as shells, flaking, burns, head checking, spalling and corrugation. Typically, these types of surface flaws negatively impact the contact point of the ultrasonic sensor/couplant and prevent the ultrasonic system from being able to detect the sub surface flaw deeper in the rail. Other factors that impact such measurements include heavy lubrication or debris such as dirt on the rail head. Magnetometers are less sensitive to these obstructions and provides for a better opportunity to identify an internal flaw.

By leveraging an automated x-ray source and detector plate and associated apertures and collimation blockers configured in a repeatable geometry, the x-ray system is able to reliably generate images of the rail and associated flaw. Although there is substantial energy needed for the x-ray to produce an image, it is a short duration and takes seconds rather than the many minutes it can take a human to exit a hi-rail ultrasonic inspection truck, manually inspect the flaw with a handheld ultrasound probe, and take multiple measurements to validate the flaw as well as the additional time required to get back into the hi-rail inspection truck and resume inspection duties within the truck. Additionally, the web and the head of the rail can be imaged individually to ascertain highest quality images so that flaws in the head of the rail can be captured without excessive radiation through the web of the rail impacting the sensitivity of the detector plate in/around the head of the rail.

With any radiation source, the safety of the operator and others nearby is paramount. Through automation, an on-site operator is not required. Through appropriate collimation, apertures and shielding, the radiation exposure is restricted to a small area near the source whereby humans and other animals are not radiated and can safely operate in the general vicinity of the equipment. To ensure a high level of safety and ensure that people in the vicinity of the x-ray source when it is emitting radiation, a beacon or visible light ring is emitted. The system may also include an audible warning providing advance notice that the x-ray source will be turned on or is actively emitting radiation.

Offset imaging is a technique known in the radiation imaging industry whereby the source is not directly in line with the target (i.e. flaw). The result of which transmits radiation in "offset" angles creating an enhanced image of the flaw that might not be captured with the source transmitting in-line with the target (i.e. flaw). Offset imaging allows for better detection of flaws that may not be in the same plane as the source to include transverse and horizontal planes. Automation technology allows the x-ray to be positioned in multiple locations along the longitudinal direction of the railroad track, allowing creation of multiple x-ray images that include offset and in-line images. Additionally, minor variations in the height of the x-ray source in relationship to the rail introduce a vertical offset that supports identification/imaging of flaws in the horizontal plane.

Variations in the geometry of the x-ray system as it relates to the rail and detector plate can result in reduced quality of the x-ray image. More specifically, if one considers a railroad track with two generally parallel rails, the distance or gauge between those rails can vary on the order of inches. The variation in gauge impacts how a rail inspection vehicle sits on the rails. The inspection vehicle could favor one rail or the other. Because the geometry of the source in relation to the rail impacts the quality of the image and the ability to detect flaws, the x-ray source and detector plate or the vehicle itself is able to adjust laterally or perpendicularly to the direction of the rails so that physical geometry of the source as it relates to the rail is maintained and high image quality is achieved.

The set off height or distance between the rail and the passive magnetometer sensor impacts the ability to detect a magnetic disturbance or change in magnetic field. In order to sense magnetic fields in a repeatable manner, a combination of wheels, guide plates, and wear plates are used to set the distance. The set off distance for one or an array of magnetometers may be different from another magnetometer or an array of magnetometers in order to sense the magnetic field and help determine size of a flaw, crack, or other track anomaly. This set-off distance may be achieved through the use of a wheel (or multiple wheels) mounted to the sensor module where wheel height may be adjusted to ascertain an ideal sensing configuration.

When x-ray images are captured, they may be analyzed by a human and/or by automated image processing software. The software is capable of quantifying the growth of the flaw using border detection techniques, image comparisons techniques, and other image processing technologies. This software improves the ability for the track inspector to identify areas of interest and minimize the amount of time required to qualify the type and size of flaw. This assessment can be conducted on the inspection vehicle itself or may be conducted remotely leveraging cellular or wifi communications.

Joints and welds historically have had high failure rates in the industry. Because the magnetometers can sense welds and joints, this information can be used in vehicle positioning automation allowing the vehicle to stop and conduct inspections at specific locations where welds and joints exist. This position automation feature allows the inspection vehicle to stop and inspect at every joint or weld regardless if the internal rail flaw technology detects a variation or flaw. This inspection method allows for close monitoring of track work that typically has high failure rates and where existing technology may fail to detect that a flaw even exists.

BRIEF DESCRIPTION OF THE DRAWINGS

In the drawings, closely related figures and items have the same number but different alphabetic suffixes. Processes, states, statuses, and databases are named for their respective functions.

FIG. 6 depicts the x-radiation detector plate in relationship to the x-radiation source on a vehicle in a position where the detector is ready to image the head or web of the.

DETAILED DESCRIPTION, INCLUDING THE PREFERRED EMBODIMENT

Terminology

The terminology and definitions of the prior art are not necessarily consistent with the terminology and definitions of the current disclosure. Where there is a conflict, the following definitions apply.

Field side—The side of the rail(s) pointing away from the track or the outside face.

Gauge side—The side of the rail which guides the wheel flange.

Parallel rails—One railroad track consists of two parallel rails. Standard gauge railroad track has two parallel rails that are separated by approximately 4 feet, 8.5 inches. Other railway gauges exist and may be greater than or less than standard gauge.

Railroad Track—Consists of two parallel rails, normally made of steel, secured to crossbeams called railroad ties or sleepers.

Frog—A crossing of point of two rails, usually as a common crossing or V-crossing.

This can be assembled out of several appropriately cut and bent pieces of rail or can be a single casting. A frog forms part of a railroad switch, and is may also be used in a level junction or flat crossing.

Joint Bar or Fish Plate—Typically a steel bar that joins two steel rails longitudinally using bolt holes and bolts.

Welded Joint or Continuously welded rail—A weld that physically bonds two rails together with no joint bar or other mechanical fixture.

Insulated Joint—Usually consisting of a joint bar, bolts, and holes that are mechanically connected but isolated by a non-conductive material such as rubber or plastic whereby two rails are physically connected but electrically isolated.

Flangeway—The general area on each side of the gauge side of the two generally parallel rails where railroad wheel flanges pass and aid in keeping train wheels within the lateral confines of the railroad track.

Set Off Distance—The pre-configured height or distance of a sensor from the target.

Source—The x-radiation emitter. Example sources include, but are not limited to, Golden Engineering's XR line of x-ray sources. The radiation is preferably generated through electrical emitting electrons to generate x-rays. However, it is not restricted to electron generated radiation, and may utilize gamma rays emitted by an atomic nucleus.

Detector plate—An x-radiation imaging plate that may utilize traditional film technologies or digital technology to capture the radiation from the source.

Operation

The following detailed description of the invention references the accompanying drawings which form a part hereof, and in which are shown, by way of illustration, specific embodiments which may be practiced. Understand that other embodiments may be used, and structural changes may be made without departing from the scope of the present disclosure.

Figure 1:
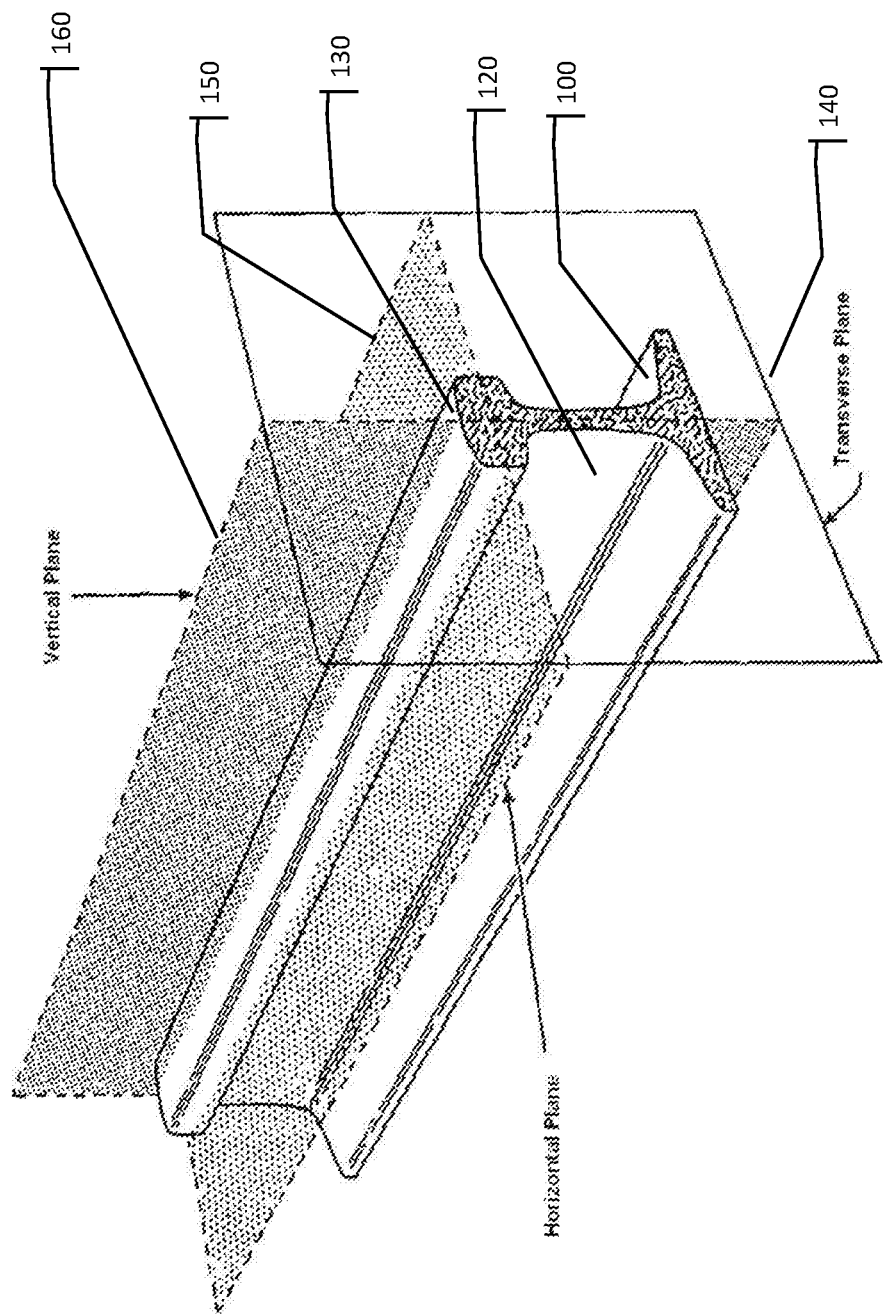
FIG. 1 is a diagram of the longitudinal and cross sections of a rail.

Referring to FIG. 1, the head of the rail is 130. The web of the rail is 120. The base of the rail is 100. Internal flaws can exists in any section of the rail but are most common in the head of the rail. Flaws can be found in the transverse plane 140, horizontal plane 150, or vertical plane 160.

Figure 2:
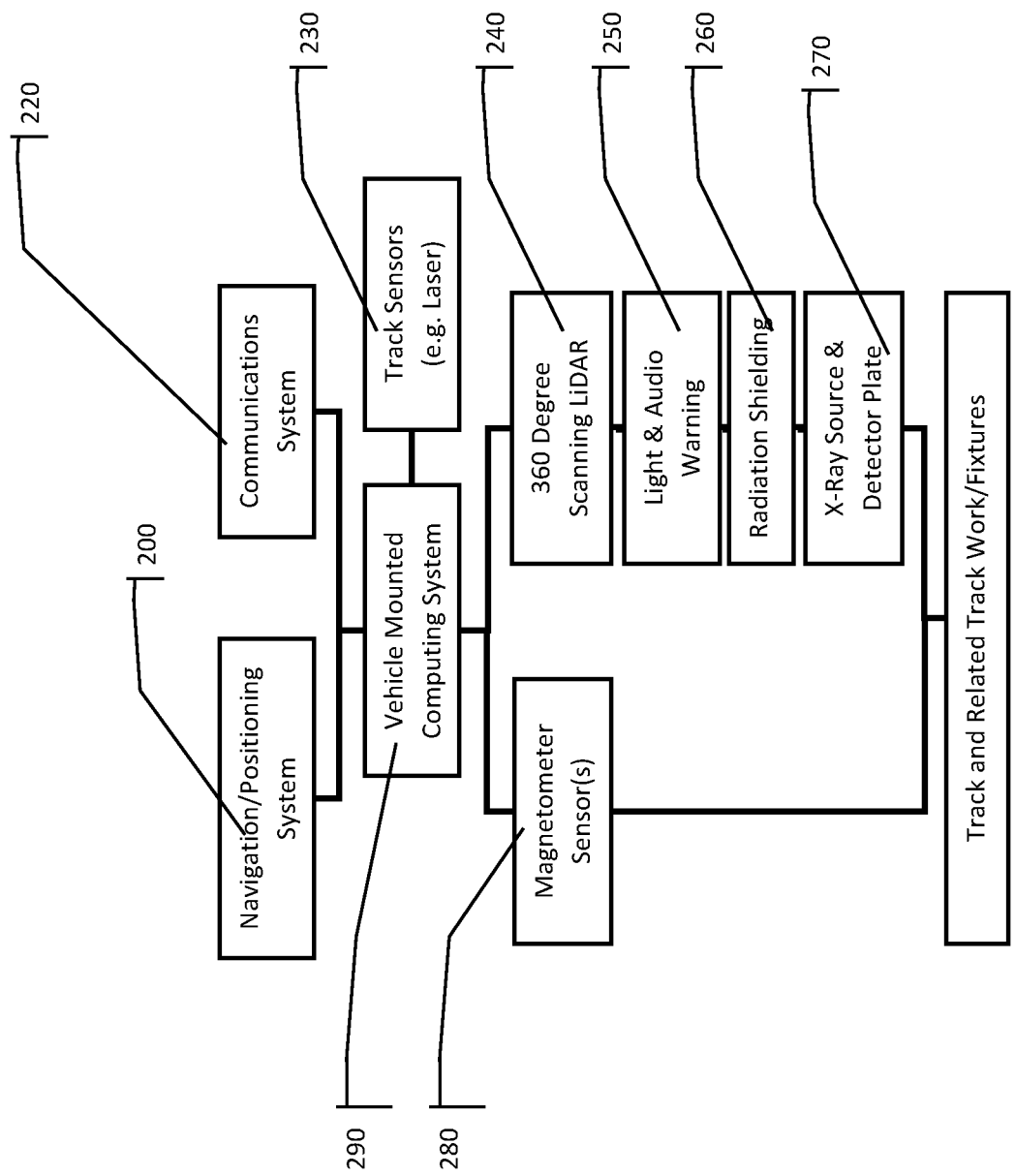
FIG. 2 is a system diagram of the major components of an internal track inspection system utilizing both magnetometer and x-radiation technology.
Figure 3:
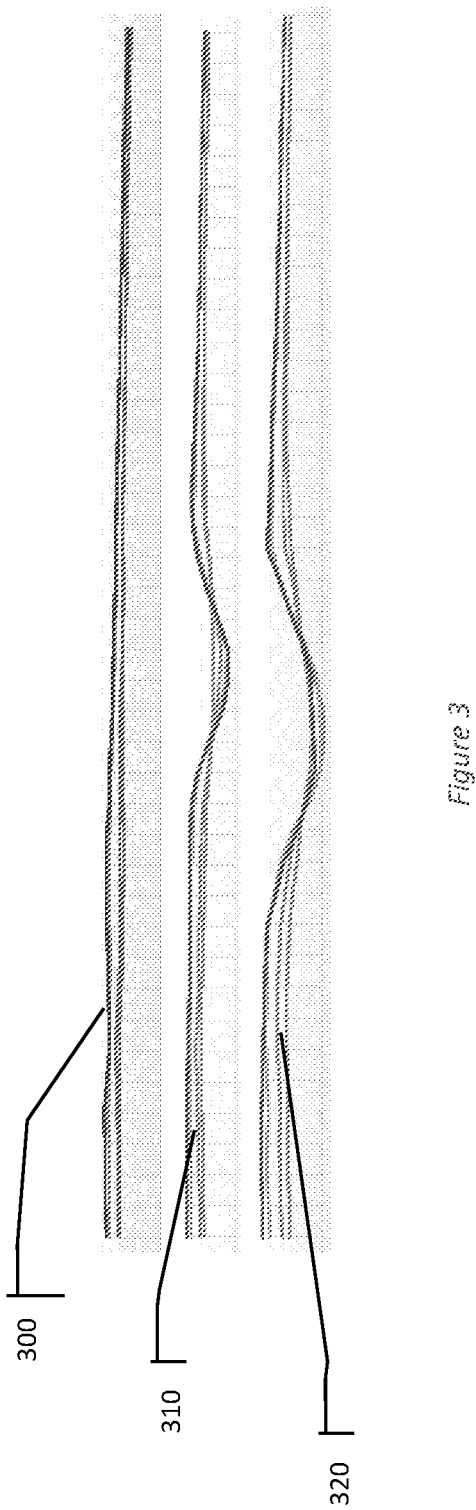
FIG. 3 depicts a series of three repeated magnetometer readings after a physical deformation in the rail with distance along the x-axis on the plot and the gauss reading on the y-axis of each plot.

Referring also to FIG. 2, a preferred system embodiment includes a navigation and positioning system 200 that allows a mobile or robotic platform to move along a railroad track whereby sensors capable of detecting changes in the magnetic field 280 in one or both of the rails of a railroad track. Referring also to FIG. 3, when the magnetic field exceeds a pre-defined tolerance measured in gauss or a rate of change 300, 310, 320 in gauss as computed by the vehicle mounted computing system 290, the robotic vehicle is commanded by the vehicle mounted computing system 290 to execute a more detailed internal flaw inspection using a x-radiation system 260, 270. The pre-defined tolerance or rate of change may be set for an entire rail, or varied based on position of the rail allowing comparison with prior measurements at the same location, and vehicle mounted computing system may process, store, and analyze magnetometer data, or communicate wirelessly to send such data for remote storage and analysis. After the magnetometer sensor(s) 280 detects a potential flaw or magnetic change or magnetic field, the robotic platform is instructed by the vehicle mounted computing system 290 to re-position the vehicle using the navigation/positioning system 200 to align the x-ray source and detector plate 270 in the same location where the magnetometer(s) 280 detected a change or flaw in the rail. The 360 degree scanning LiDAR 240 determines if there are any obstructions, specifically humans or animals, that may be within the unsafe radiation zone that is defined by the light and audio warning 250 system. If an obstruction does exist within the unsafe radiation zone, the vehicle mounted computing system 290 prevents the x-radiation source from being activated. With no obstruction, the track sensors 230 providing lateral position distance from the rail are used by computing system 290 to laterally position the x-ray source and detector plate 270 in the raised state. If no obstruction continues to exist the radiation shielding 260 deploys to minimize any potential for back scatter x-radiation. After the shielding 260 is deployed in addition to the light and audio warning 250 and the vehicle is confirmed to be in the proper location by the navigation/positioning system 200 the x-radiation source and detector plate 270 is lowered into position in the proper geometry in relationship to the rail. When the source and detector plate are lowered and safety switches are fully engaged indicating proper positioning of shielding, source, and detector, the vehicle mounted computing system 290 enables power to the x-radiation source 270. At the completion of the imaging capture by x-ray radiation source 270, computing system 290 disables x-radiation power. After power is disabled, x-ray radiation source 270 and shielding 260 retract to avoid any obstacles in or around the track while the vehicle is in motion. Additionally, the light and audio 250 are disabled whereby the vehicle mounted computing system 290 instructs navigation and positioning system 200 to continue movement along the railroad track while monitoring magnetometer sensor(s) 280. When magnetometer sensor(s) 280 identifies another flaw, the x-radiation system is re-deployed in the same manner as above. In addition, the x-radiation source 270 and related accessories may be deployed at set intervals or based on previously known locations such as rail welds identified by navigation and positioning system 200. In this case, the vehicle may use the magnetometer or alternatively just utilize the x-radiation system and related accessories to inspect the rail. The geometry of the detector plate in relationship to the source and the rail impacts the quality and ability of the system to detect or image flaws. Track sensors 230 provide lateral vehicle position information so that the source and detector plate 270 can be adjusted laterally in relationship to the rail so that proper geometry can be maintained during the inspection process.

Figure 10:
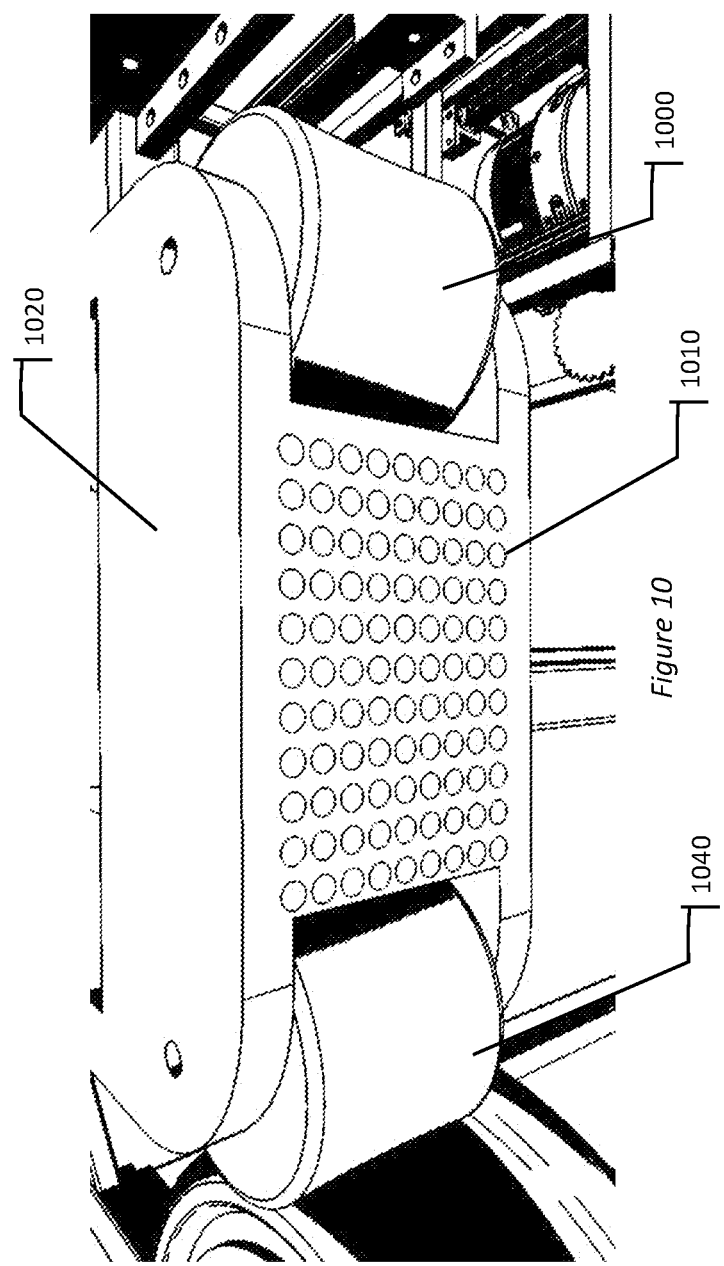
FIG. 10 depicts the underside of the magnetometer sensing sled that holds an array of magnetometers at a set distance above the top of the rail through the use of two roller wheels.

Referring also to FIG. 3, the output generated by the magnetometer(s) is illustrated over a series of inspections over the same location on the rail whereby the flaw grew in size after each consecutive pass. Plot 300 shows the first pass of the magnetometer prior to the flaw being present. Plot 310 depicts a minor flaw being introduced to the rail, while Plot 320 depicts more severe damage to the rail after the flaw grew in size. Along the x-axis of each plot is the longitudinal distance along the rail. On the y-axis of each plot is the relative gauss reading. Referring also to FIG. 10, the combination of lines on each plot in FIG. 3 is from one individual magnetometer. Additional magnetometers may be arrayed as in magnetometer array 1010 to measure at multiple locations along the surface area of the rail.

Figure 4:
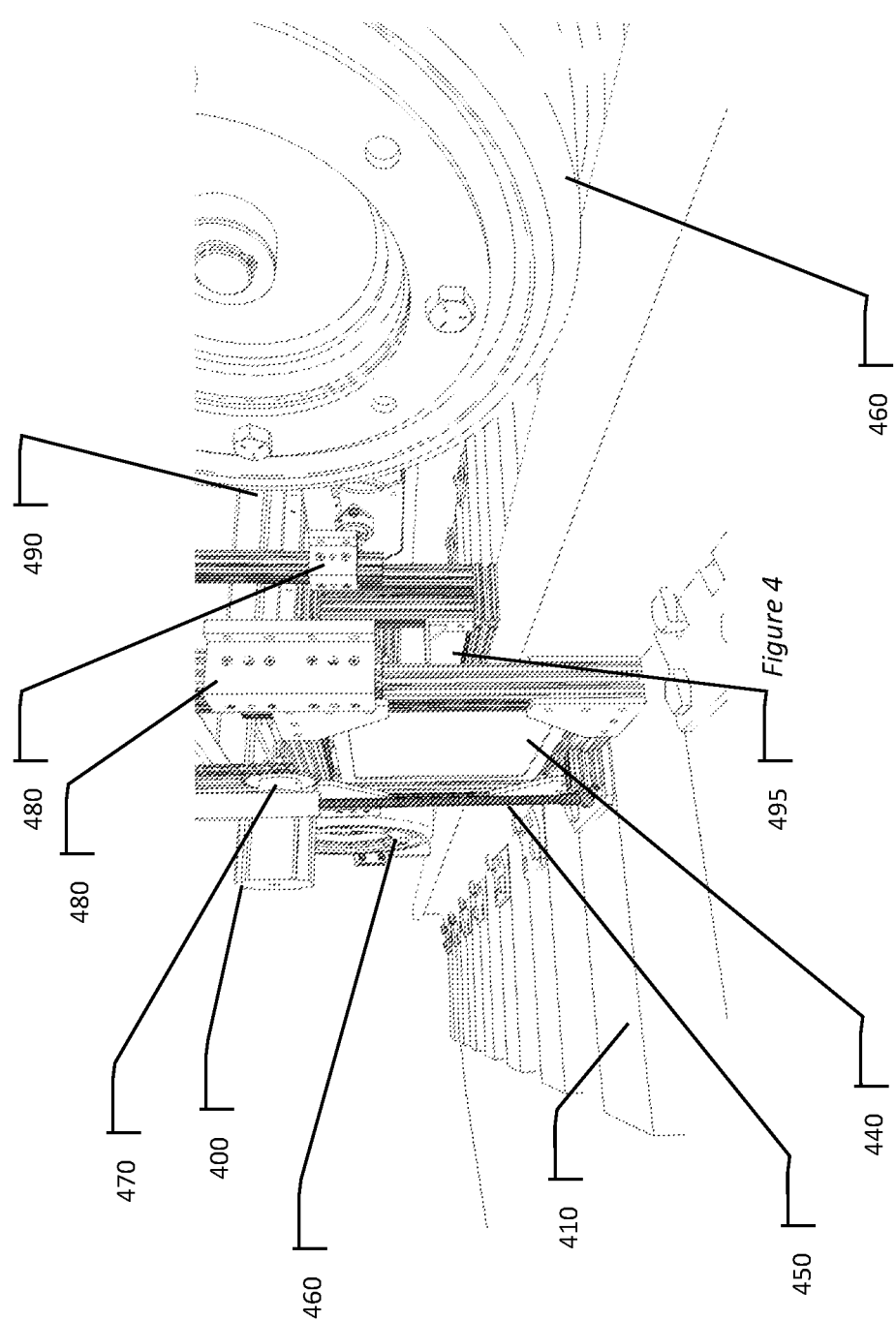
FIG. 4 illustrates the detector plate and top of rail shielding attached to the vehicle chassis viewed from the outside of the vehicle.

Referring also to FIG. 4, when commanded by the navigation computer 200, the vehicle may stop to deploy the detector 440 and top of rail shielding plate 495. Detector 440 consists of an electronic or analog detector plate mounted in a supporting structure that moves on slides 480, powered by a motor 400 and gear system 470, into a lowered state along the top of the tie 410 or in parallel with the base of the rail 100. Upon a power failure, motor 400 and gear system 470 are back driven by strut 450. A top of rail shielding 495 plate may consist of lead or water to prevent over exposure of radiation on detector 440 allowing for improved imaging quality. In a similar manner as detector 440, shielding plate 495 moves into a lowered state by motor 400 via slides 480 as the top of rail shielding 495 is mechanically linked with detector 440. The combination of detector plate 440 and top of rail shielding 495 and the related structure are affixed to the vehicle chassis 490. In this depiction, the structure is mounted between two rail bound wheels 460 but may be positioned fore or aft of these wheels.

Figure 5:
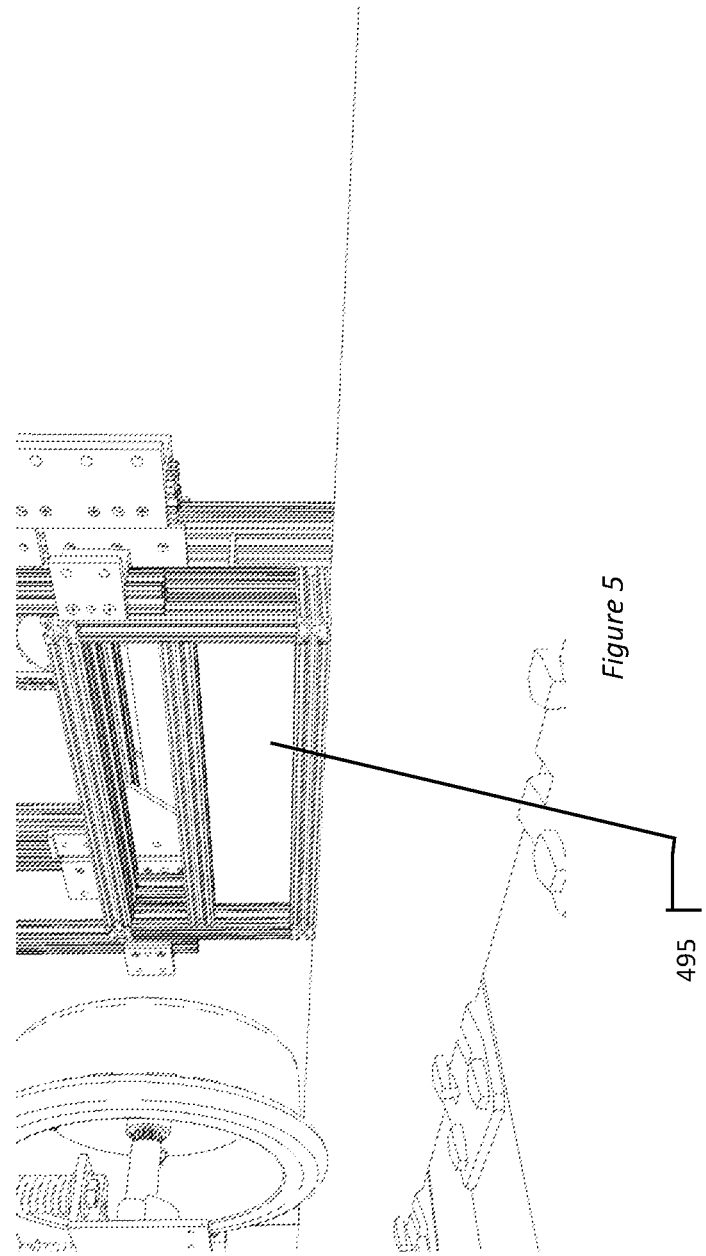
FIG. 5 depicts the top of rail shielding viewed from the inside of the vehicle.

Referring also to FIG. 5, the top of rail shielding 495 is shown as viewed from the inside of the vehicle.

Figure 6:
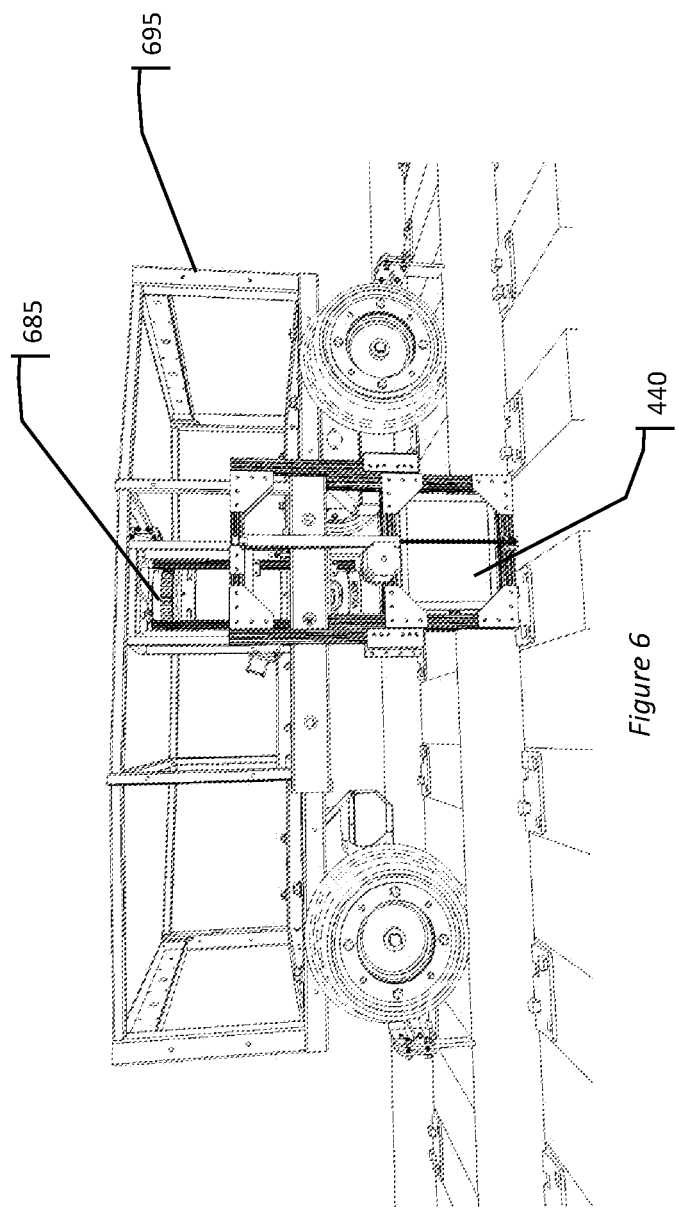

Referring also to FIG. 6, the x-radiation detector plate 440 is shown in relationship to the x-radiation source 685 on a vehicle 695 in a position where the detector is ready to image the head or web of the rail.

Figure 7:
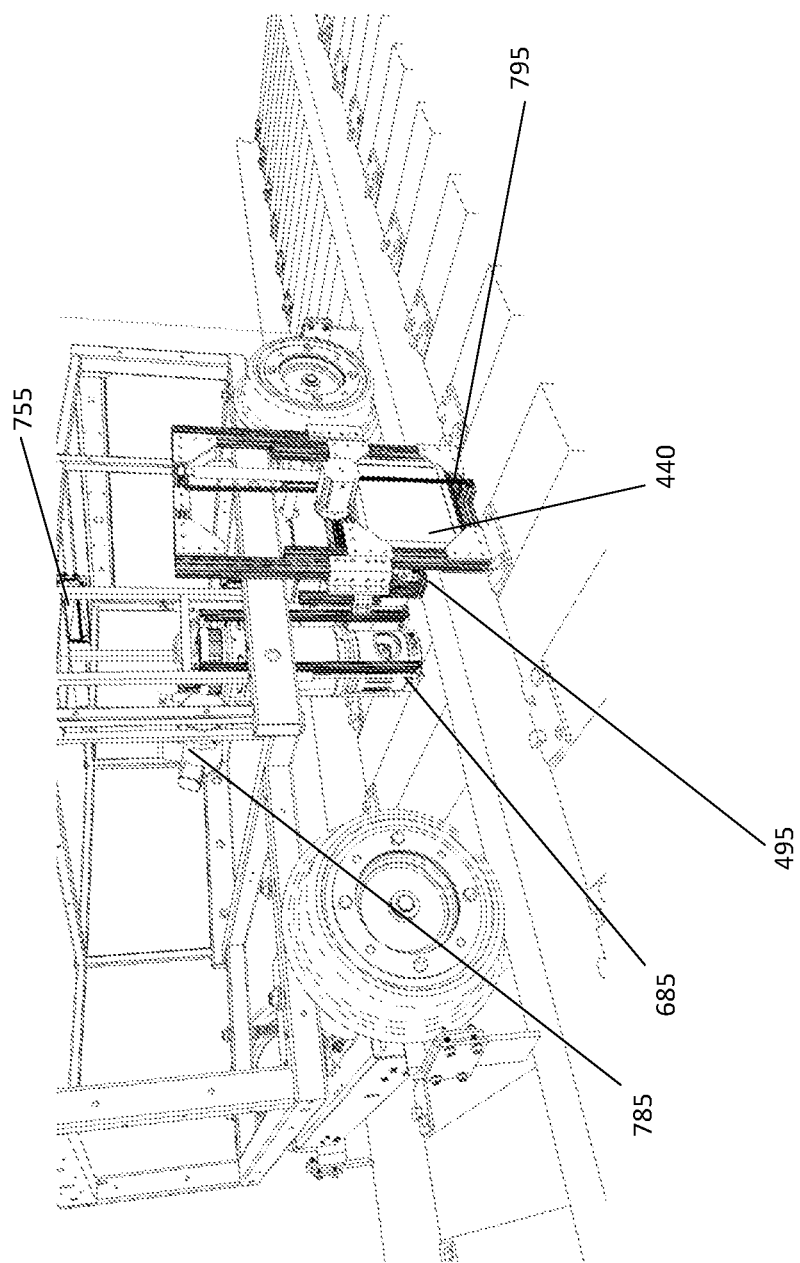
FIG. 7 depicts the x-radiation source in the lowered state in line with the detector plate viewed from the outside of the vehicle.
Figure 8:
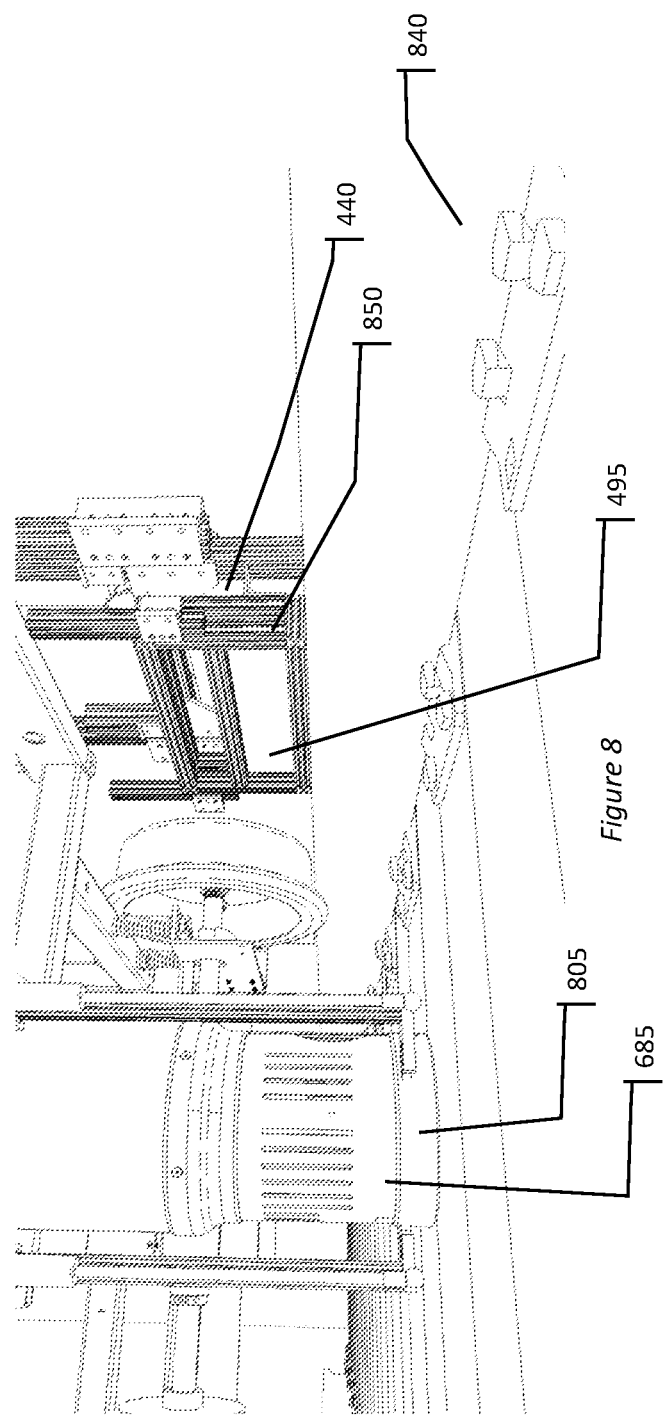
FIG. 8 depicts the x-radiation source inline with the detector plate and top of rail shielding, viewed from the inside of the vehicle.

Referring also to FIG. 7, the source 685 is shown in the lowered state in line with detector plate 440 and top of rail shielding 495. The source uses a similar deployment method as the detector plate whereby motor 785 engages a drive sprocket to lower the source. At least one strut 795 raises the source upon power failure of motor 785. In addition to vertical movement, the source can be moved laterally to improve image quality via at least one track actuator 755. Referring also to FIG. 8, the source 685 is shown in line with the detector plate 440 and top of rail shielding 495. Plate 805 is interconnected with an internal limit switch that indicates the source has reached its lowest point. Top of rail shielding 495 may consist of a lead shot bag that is able to conform to the top of the rail 840. An internal contact switch encapsulated in detector plate housing 850 indicates when the top of rail shielding is in position on the rail 840.

Figure 9:
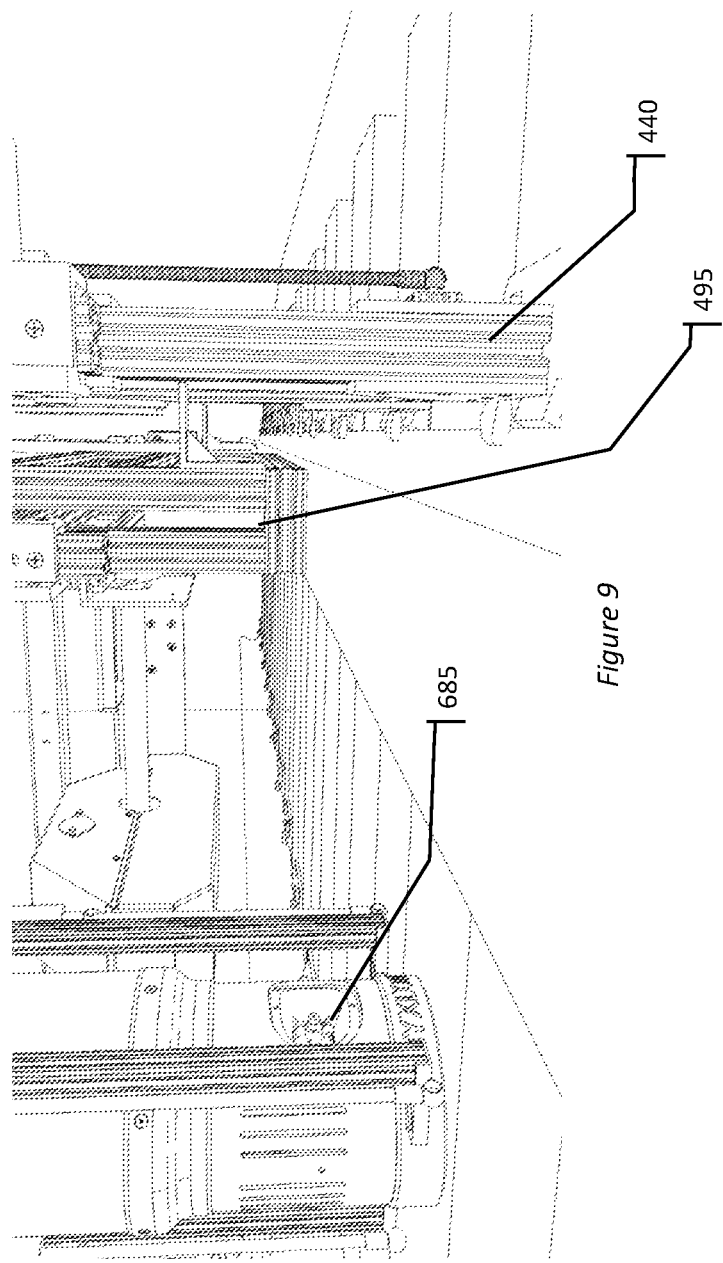
FIG. 9 depicts the source, top of rail shielding, and detector plate, viewed along the longitudinal direction of the rail.

Referring also to FIG. 9, the view along the longitudinal direction of the rail depicts the source 685, top of rail shielding 495 and detector plate 440.

Figure 11:
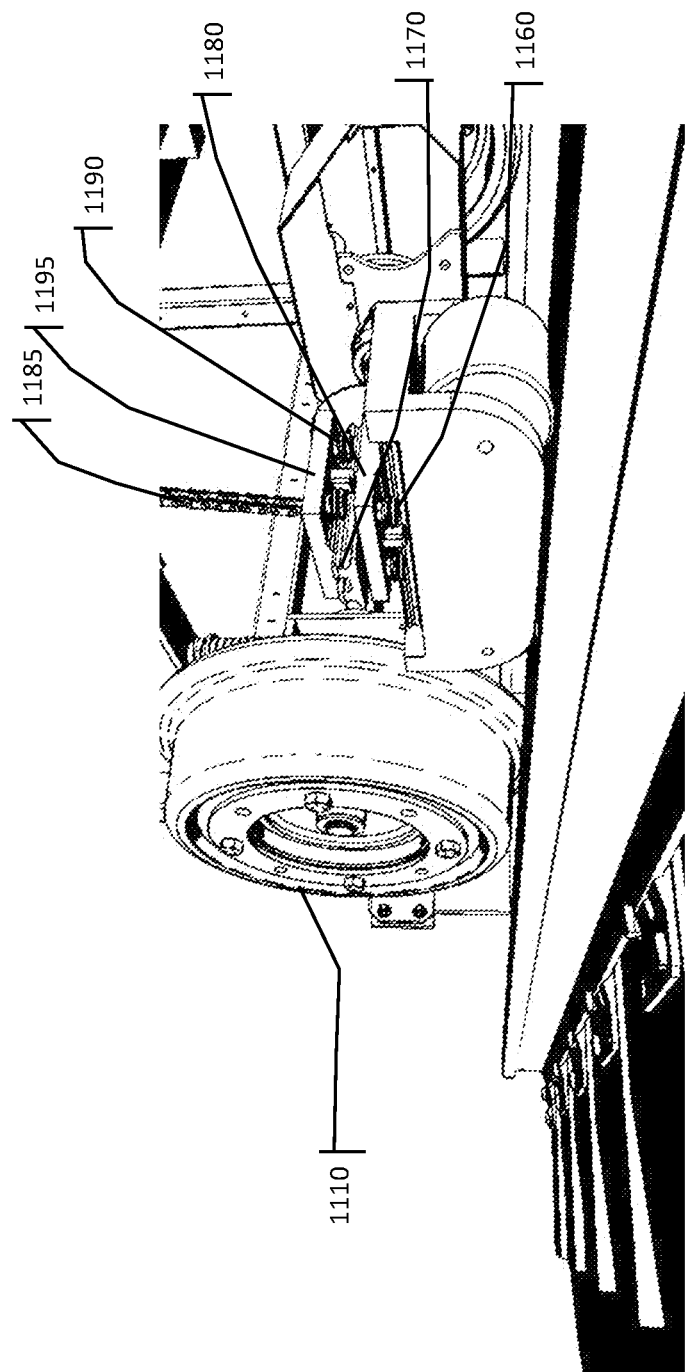
FIG. 11 depicts the magnetometer sensing sled on the top of the rail attached to the vehicle chassis.
Figure 12:
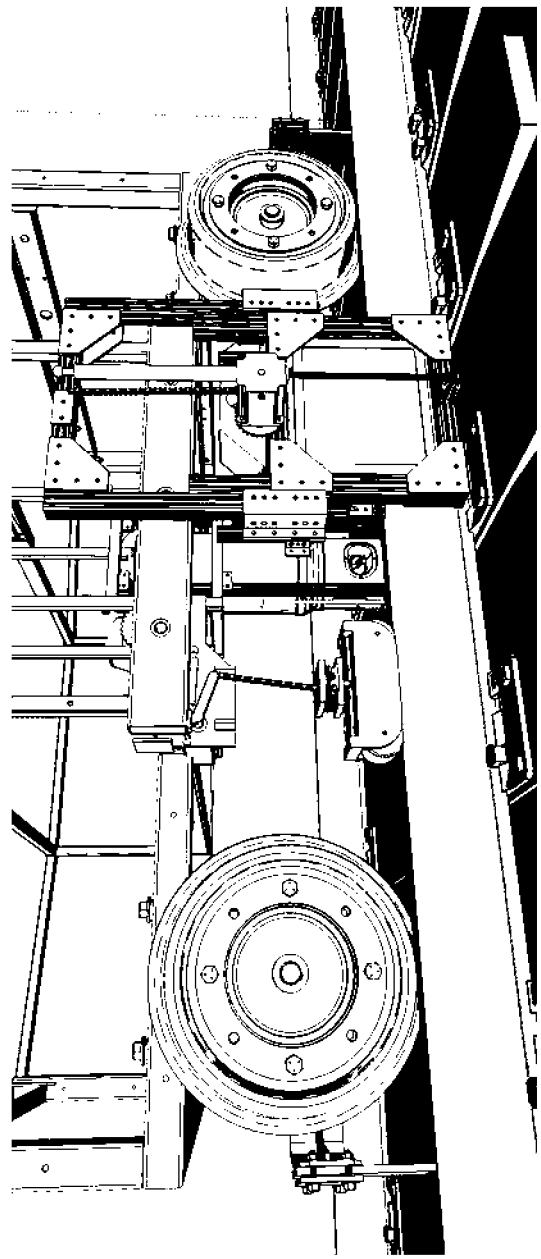
FIG. 12 depicts the magnetometer sensor sled in relationship to vehicle chassis and x-radiation source and detector plate.
Figure 13:
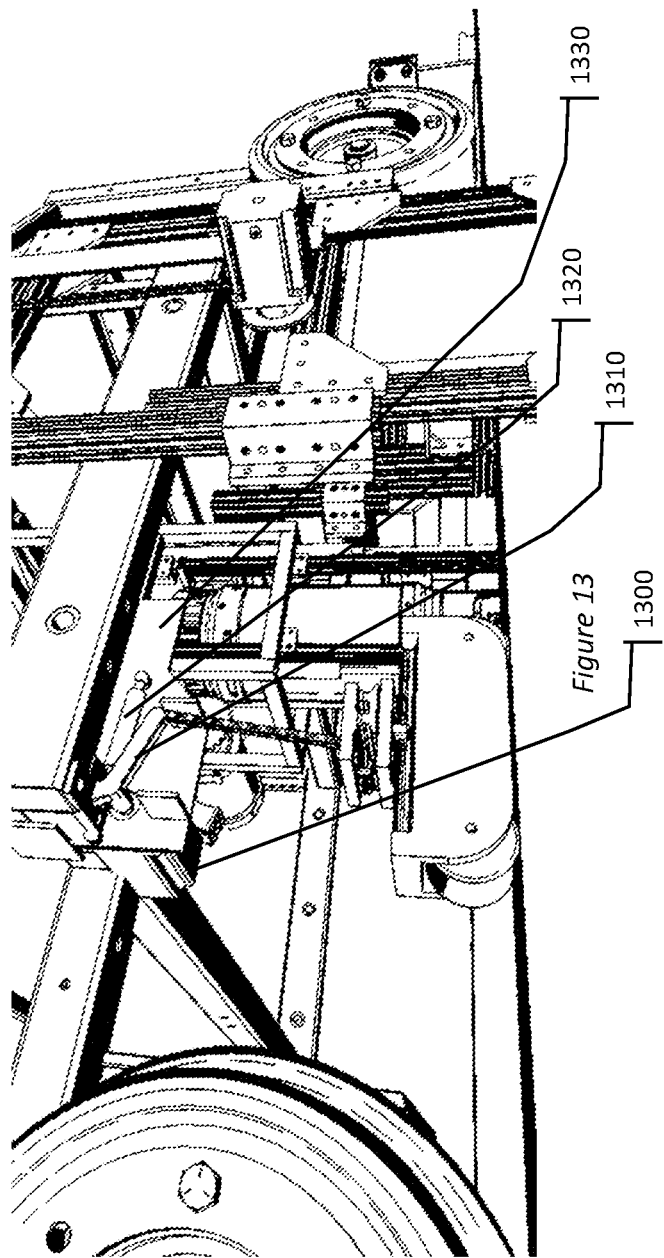
FIG. 13 illustrates the mechanical system that raises and lowers the magnetometer sled.

Referring also to FIG. 10, a magnetometer guide shoe 1020 is encapsulated in a non-ferrous material that consists of an array of magnetometers 1010. The guide wheels 1000 and 1040 can be adjusted within guide shoe 1020 to control the set off distance between the magnetometer array and the rail. Referring also to FIG. 11, the magnetometer shoe is capable of moving laterally as well as longitudinally along the length of rail as to prevent significant impact at a joint or some other obstruction through linear slides and bearings 1160, 1170, 1180, 1190, and 1195. The magnetometer shoe can be raised off the rail by retracting chain 1185. Referring also to FIG. 13, arm 1310 attached to motor 1300 counteracts the upward lifting force of strut 1320 that is connected to plate 1330 connected to the vehicle chassis. Strut 1320, upon a power failure in motor 1300 will retract the magnetometer shoe. In this configuration the magnetometer guide shoe is between the two vehicle wheels 1110 to help protect from damage by debris on the rail.

Figure 14:
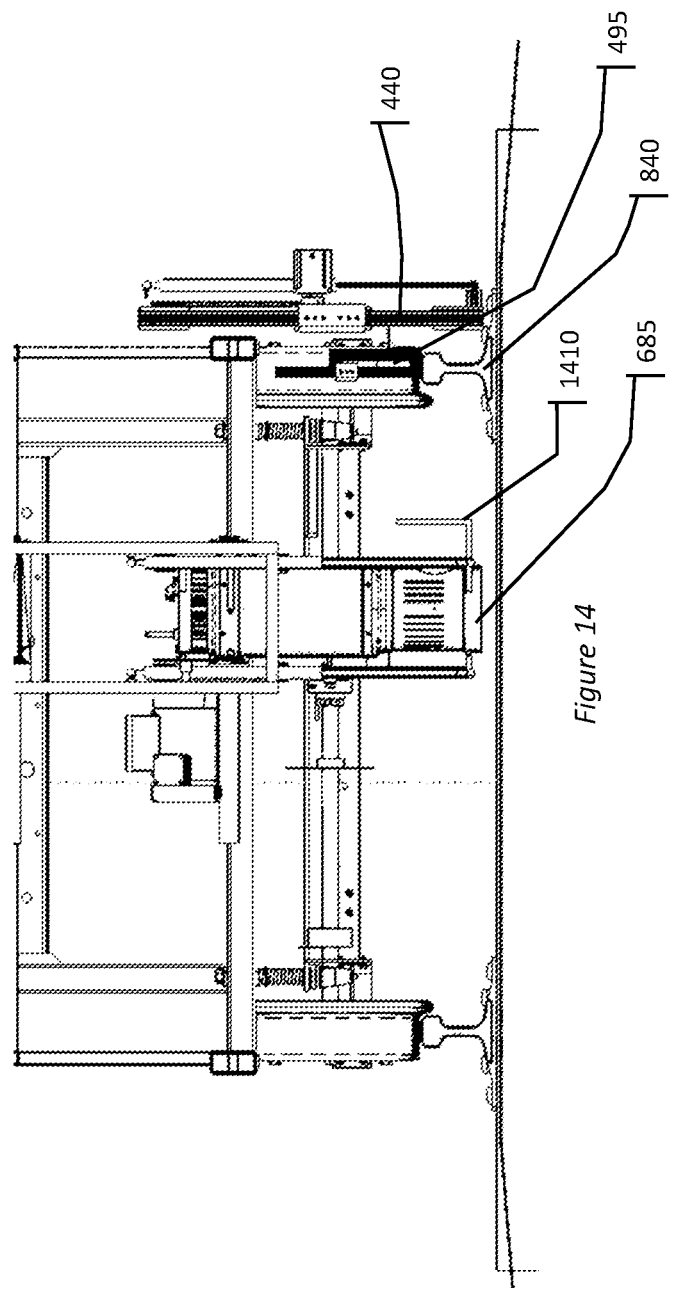
FIG. 14 is an isometric view depicting the geometry of the x-radiation source, collimator, rail, top of rail shielding, and detector plate.
Figure 15:
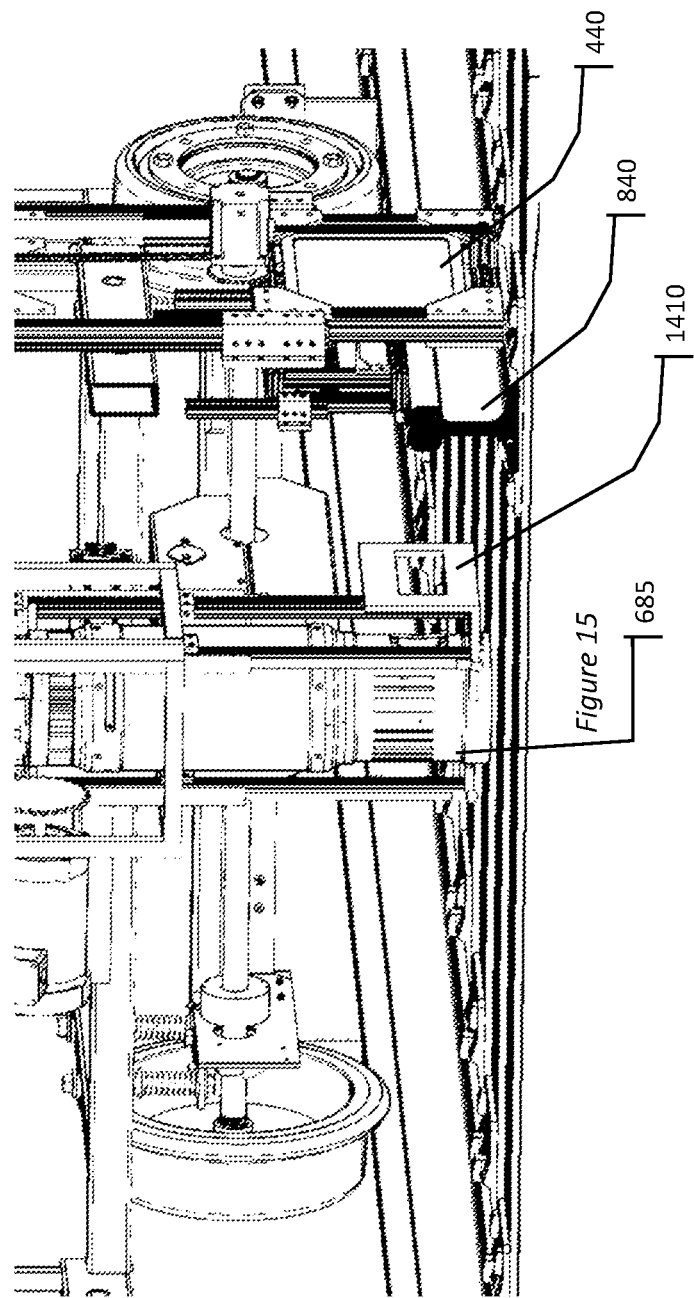
FIG. 15 shows an offset view of FIG. 14 depicting the window in the collimator.

Referring also to FIGS. 14 and 15, depicts the geometry of the radiation source 685 is depicted in relationship to the collimator 1410, the rail 840, the top of rail shielding 495 and detector plate 440. The source 685 is set an approximate distance of 13 inches from the rail when the source is activated. The detector plate 440 may be positioned in direct contact with the field side of the rail or up to approximately 6 inches away from the rail. The purpose of the top of rail shielding 495 is to ensure that detector plate 440 does not become over saturated. Rail shielding 495 may consist of a fabric or flexible material that conforms to the shape of the top of the rail where the fabric or flexible material is filled with a radiation blocker such as lead or water. Collimator 1410 provides a small opening of approximately 54×75 millimeters and may be as small as 35×75 millimeters as shown in FIG. 15. The collimator opening may be fixed or automatically adjustable, and the opening and positioning allows radiation to penetrate and image the head, the web, or the base of the rail, or a combination of the parts of the rail at one time. The collimator 1410 may be positioned approximately 5 inches away from the source 685 and approximately 12.5 inches away from the rail. This geometry of source to rail to detector plate helps maximize quality of the capture image.

Figure 16:
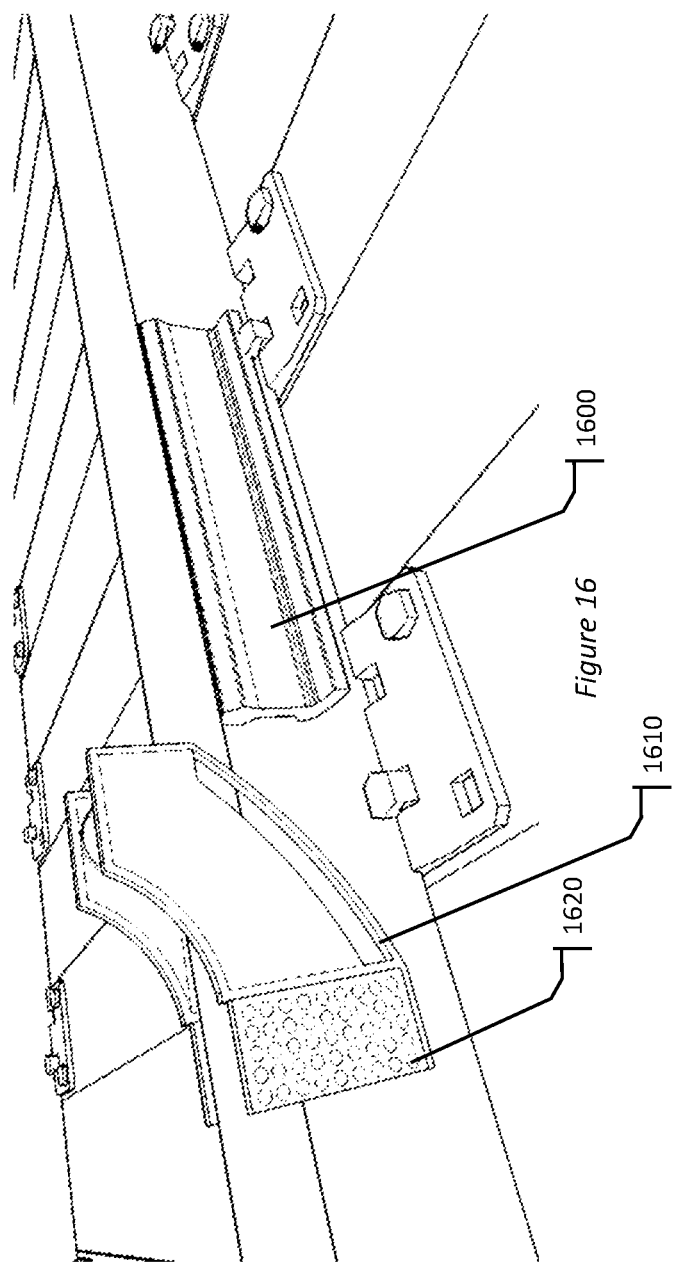
FIG. 16 depicts an example of a typical rail obstruction.
Figure 17:
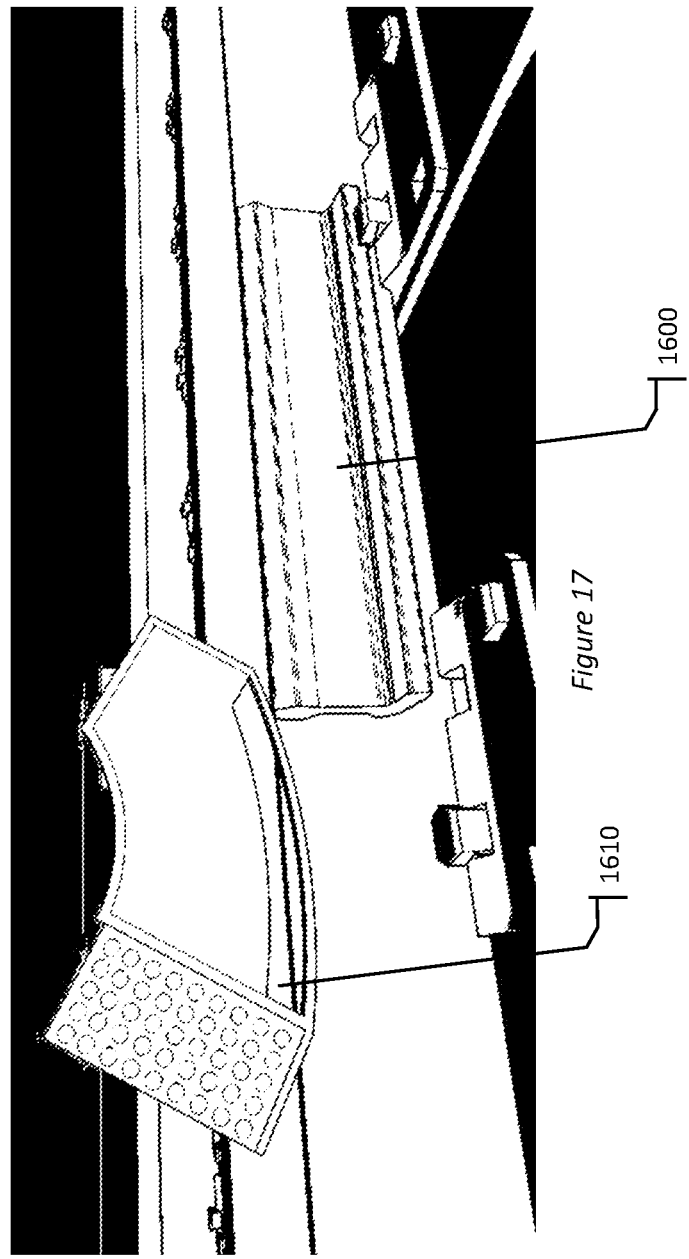
FIG. 17 shows a guide shoe retracted on one side and lowered on the other side to avoid the obstruction.
Figure 18:
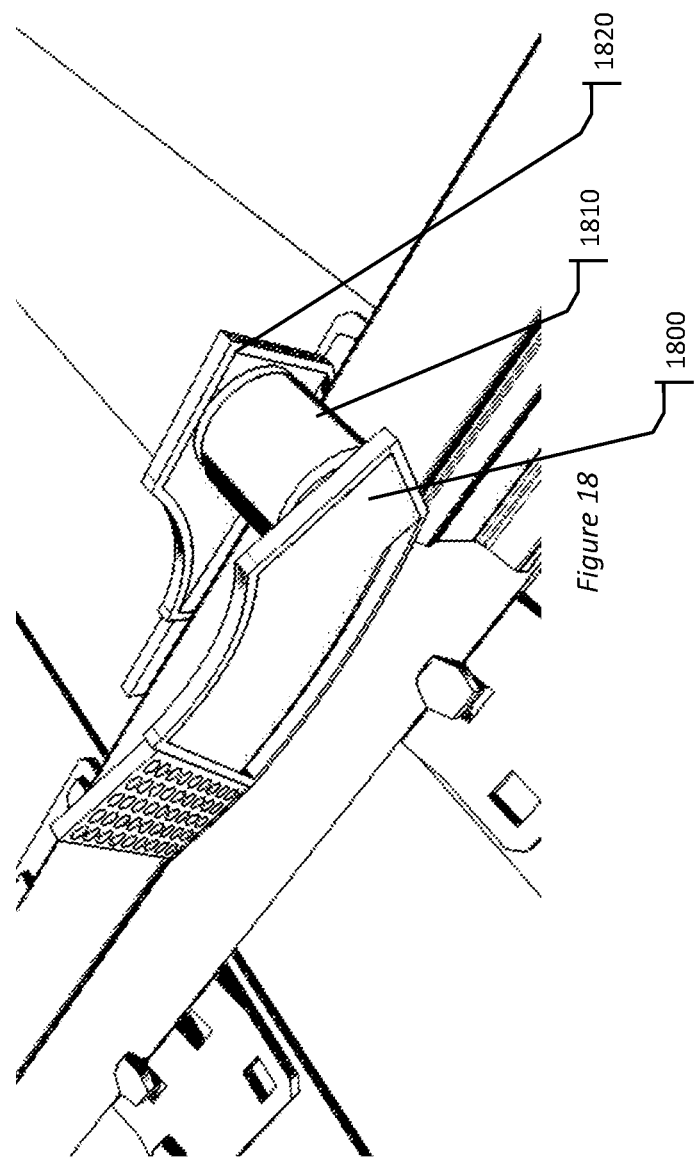
FIG. 18 depicts three primary assemblies of the alternative guide shoe shown in FIGS. 16-17.

Referring also to FIGS. 16-18, an alternative guide shoe is able to position magnetometers into areas around the base and web of a rail without manual intervention, while also avoiding rail obstructions. Three primary assemblies enable the guide shoe to traverse a diversity of track fixtures such as a joint bars 1600 on either gauge or field side of the rail. Magnetometer shoe 1800 is the field side magnetometer shoe containing an array of magnetometers 1620. Magnetometer shoe 1800 is duplicated on the gauge side of the rail containing the same array of magnetometers as in array 1620. The magnetometer shoes are connected via an axle within a free wheel 1810 that rides along the top of the rail head. The axle is connected to a fixture that connects to the chassis of the vehicle (not shown). Magnetometer shoes 1800 and 1820 may be spring loaded in the down position or may be held down by gravity. A relatively narrow magnetometer shoe may, on the gauge side, ride within the flangeway of the railroad track. A typical obstruction such as a joint bar 1600, upon contact with flexible barrier 1610, results in magnetometer shoe 1800 pivoting around the axle within guide wheel 1810. The guide shoe may retract on one side and remain lowered on the other side. Both sides may be raised (not depicted) while the guide wheel 1810 remains in contact with the top of the rail. The guide shoe may be made out of consumable materials that have a high durometer so that they may contact the gauge and field side of the rail. Barrier 1610 may be made out of a combination of materials to allow for resilience to accept the repeated contact with joints and other track fasteners.

OTHER EMBODIMENTS

In addition to conducting inspections on railroad tracks already laid, the same technology may be used to assess and baseline rail as it first comes out of the manufacturing process. The baseline magnetometer or x-ray information may play an important part in the projection of where a potential flaw could grow and expand after installation in an operational environment. Additionally the baseline information may be used immediately after the manufacturing process and during the storage process to monitor the change in the rail and impact of environmental conditions on the rail during the storage process.

Multiple or smaller dedicated x-ray sources may be used to specifically focus x-radiation at multiple locations along the rail within the general confines of the inspection vehicle whereby offset imaging can be conducted at the same time using multiple sources and associated detector plate(s). These sources may be small enough to fit within the flange way of a railroad track minimizing the need to move, position, or adjust the x-ray source to target geometry. At the same time, the more focused energy results in less scatter and minimizes the need for heavy shielding to minimize radiation leakage. Multiple x-ray sources may be used to image both rails at the same time without the need to re-position or adjust the source.

As x-radiation sources become smaller and more focused in specific geometries, radiation imaging could be captured continuously while the inspection vehicle continues to move. Using Doppler shift techniques allows combination of many images to create a continuous image of the rail. This results in a more efficient inspection process and reduces the overall time needed to inspect.

Both magnetometers and x-ray technology is not only capable of sensing flaws in the two generally parallel rails of a railroad track, but the technology may be optimized to inspect other track fixtures such as frogs, gauge rods, points, bolts, tie spikes or tie fasteners, and other special track work associated with switches, crossovers, joints, etc. This may require robotic or automated re-positioning of the x-ray source and detector plate pair as well as the magnetometer sensors to achieve desired results.

Insulated joints may also be inspected using the x-ray system to ensure that the insulation gaps and related isolation material maintains proper spacing and overall electrical isolation between the two conductors.

The x-ray system to validate detected flaws may also be replaced with an ultrasound system for ultrasonic validation, or other imaging systems. In addition, the x-ray system may be deployed independent from the passive magnetometers, such as for use inspecting areas previously identified of concern, through manual local or remote operation, or in conjunction with other detection systems able to indicate possible flaws.

Understand that the above description is illustrative, and not restrictive. Many other embodiments will be apparent to those of skill in the art upon reviewing the above description. Determine the scope of the invention with reference to the appended claims, along with the full scope of equivalents to which such claims are entitled.

What is claimed is:
1. A track inspection device comprising:
a self-powered autonomous rail vehicle;
a system of passive magnetometry on the rail vehicle comprising one or more passive magnetometers and a computer system, wherein the system of passive magnetometry detects changes in the magnetic field of a rail without exciting the rail by magnetic induction nor by transmitting an electronic current into the rail;
a guide shoe mounted to the rail vehicle and housing the one or more passive magnetometers in an array, the guide shoe positioning the one or more passive magnetometers to measure a magnetic field within a rail while the rail vehicle operates at speeds greater than twenty miles an hour;
one or more guide wheels within the guide shoe controlling a set off distance between the rail and the one or more passive magnetometers;
one or more linear slides and bearings within the guide shoe to traverse rail joints or gaps in the rail while maintaining magnetometer set off distance;
an automated radiation source mounted to the rail vehicle and deployable to one side of the rail;
an automated x-ray detector plate mounted to the rail vehicle and deployable to a second side of the rail to detect radiation from the radiation source through the rail;
a rail shielding mechanically linked with the detector plate such that when the detector plate is deployed to the second side of the rail the rail shielding is positioned on top of the rail to minimize backscatter radiation;
a collimator deployable between the radiation source and the rail, the collimator positioned and sized to control radiation penetration of the head of the rail or the web of the rail or the base or the rail or a combination of parts of the rail;
a 360 degree Light Detection and Ranging (LiDAR) system operable to detect obstructions and/or animals and/or humans within a radiation zone around the rail vehicle;
a light and audio warning system operable during x-ray to illuminate and warn of a radiation zone; and
wherein the computer system is on the rail vehicle, the computer system:
receiving data from the one or more passive magnetometers;
controlling speed of the rail vehicle;
monitoring data from the one or more passive magnetometers to detect possible internal rail flaws based on the measured magnetic field exceeding a threshold variation, or rate of change variation, from one or more prior measurements at a same rail location or adjacent measurements along the rail;
stopping the rail vehicle upon detection of a possible internal rail flaw;
controlling deployment, positioning, and operation of the radiation source and x-ray detector plates after stopping the rail vehicle.
2. The track inspection device of claim 1, further comprising a second guide shoe with additional passive magnetometers to measure a magnetic field within a second rail.
3. A track inspection device comprising:
a rail vehicle;
an automated radiation source mounted to the rail vehicle and deployable to one side of a rail;
an automated x-ray detector plate mounted to the rail vehicle and deployable to a second side of the rail to detect radiation from the radiation source through the rail;

a rail shielding mechanically linked with the detector plate such that when the detector plate is deployed to the second side of the rail the rail shielding is positioned on top of the rail to minimize backscatter radiation; and a computer system on the rail vehicle, the computer system controlling deployment and operation of the radiation source and the x-ray detector plate.

4. The track inspection device of claim 3, further comprising a second radiation source and a second detector plate such that the computer system controls capture of simultaneous offset x-ray images.

5. The track inspection device of claim 3, further comprising a collimator deployable between the radiation source and the rail, the collimator positioned and sized to control radiation penetration of the head of the rail or the web of the rail or the base or the rail or a combination of parts of the rail.

6. The track inspection device of claim 5, further comprising a 360 degree Light Detection and Ranging (LiDAR) system in connection with the computer, wherein the LiDAR system is operable to detect obstructions and/or animals and/or humans within a radiation zone around the vehicle.

7. The track inspection device of claim 6, further comprising a light and audio warning system operable during x-ray to illuminate and warn of a radiation zone.

8. The track inspection device of claim 7, wherein the rail vehicle is a self-propelled autonomous vehicle.

9. The track inspection device of claim 8, further comprising one or more passive magnetometers in an array mounted to the rail vehicle and wherein the computer system receives data from the one or more passive magnetometers.

10. The track inspection device of claim 9, wherein the computer system controls speed of the rail vehicle, monitors data from the one or more passive magnetometers to detect possible internal rail flaws, stops the vehicle upon detection of a possible flaw, and positions for x-ray validation of the possible flaw after stopping the vehicle.

11. The track inspection device of claim 3, further comprising:

a system of passive magnetometry on the rail vehicle comprising one or more passive magnetometers, wherein the system of passive magnetometry detects changes in the magnetic field of a rail without exciting the rail by magnetic induction nor by transmitting an electronic current into the rail;

wherein the one or more passive magnetometers are in an array mounted to the rail vehicle; and wherein the computer system on the rail vehicle is receiving data from the one or more passive magnetometers.

12. The track inspection device of claim 11, further comprising a guide shoe housing the one or more passive magnetometers, the guide shoe positioning the one or more passive magnetometers to measure a magnetic field within a rail while the rail vehicle operates at speeds greater than twenty miles an hour.

13. The track inspection device of claim 12, wherein the guide shoe fits around the rail to position magnetometer measurement of a head of the rail, a web of the rail, and a base of the rail.

14. The track inspection device of claim 12, wherein the guide shoe is positionable for magnetometer measurement of track fixtures in addition to the rail, including at least one of a frog, a switch, and a crossover.

15. The track inspection device of claim 12, wherein the guide shoe includes guide wheels controlling a set off distance between the rail and the one or more passive magnetometers.

16. The track inspection device of claim 15, wherein the guide shoe includes linear slides and bearings to traverse rail joints or gaps in the rail while maintaining magnetometer set off distance.

17. The track inspection device of claim 16, wherein the rail vehicle is a self-propelled autonomous vehicle.

* * * * *